United States Patent
Kim et al.

(10) Patent No.: US 10,190,453 B2
(45) Date of Patent: Jan. 29, 2019

(54) VALVE FOR VEHICLE TRANSMISSION OIL COOLER BYPASS

(71) Applicants: Hyundai Motor Company, Seoul (KR); Kia Motors Corporation, Seoul (KR); INZICONTROLS CO., LTD., Siheung-si (KR); KBAUTOTECH CO., LTD., Asan-si (KR)

(72) Inventors: Jae Yeon Kim, Hwaseong-si (KR); Sang Won Lee, Incheon (KR); InJae Kang, Seoul (KR)

(73) Assignees: Hyundai Motor Company, Seoul (KR); Kia Motors Corporation, Seoul (KR); INZICONTROLS CO., LTD., Siheung-si (KR); KBAUTOTECH CO., LTD., Asan-si (KR)

( * ) Notice: Subject to any disclaimer, the term of this patent is extended or adjusted under 35 U.S.C. 154(b) by 243 days.

(21) Appl. No.: 15/177,156

(22) Filed: Jun. 8, 2016

(65) Prior Publication Data
US 2016/0363014 A1 Dec. 15, 2016

(30) Foreign Application Priority Data
Jun. 15, 2015 (KR) .................. 10-2015-0084259

(51) Int. Cl.
| F01P 7/16 | (2006.01) |
| F01M 5/00 | (2006.01) |
| G05D 23/22 | (2006.01) |
| G05D 23/12 | (2006.01) |

(Continued)

(52) U.S. Cl.
CPC ............. F01M 5/007 (2013.01); F01P 11/08 (2013.01); F16H 57/0417 (2013.01);
(Continued)

(58) Field of Classification Search
CPC ...... G05D 23/01; G05D 23/02; G05D 23/021; G05D 23/022; G05D 23/024;
(Continued)

(56) References Cited

U.S. PATENT DOCUMENTS

| 4,010,660 A | 3/1977 | Ahlen |
| 5,746,170 A | 5/1998 | Moriya |

(Continued)

FOREIGN PATENT DOCUMENTS

| CN | 102954274 A | 3/2013 |
| CN | 103527832 A | 1/2014 |

(Continued)

*Primary Examiner* — Jonathan Bradford
(74) *Attorney, Agent, or Firm* — Morgan, Lewis & Bockius LLP

(57) ABSTRACT

A valve for a vehicle may include a housing including a first inflow hole, a second inflow hole, a first exhaust hole, and a second exhaust hole, an inner body inserted in the housing and having a fixing groove, a fixing rod fixed to the fixing groove, a movable member slidably engaged to the lower end portion of the fixing rod to upwardly or downwardly move along the fixing rod according to a temperature of the transmission oil being flowed in the inside of the housing, a relief member including a penetration hole, wherein the lower end portion of the movable member is selectively movable therein, and slidably mounted in the lower end portion of the inner body, a first elastic member interposed between the movable member and the relief member, and a second elastic member interposed between the inner body and the relief member.

18 Claims, 8 Drawing Sheets

(51) Int. Cl.
    *F01P 11/08*    (2006.01)
    *F16H 57/04*    (2010.01)
(52) U.S. Cl.
    CPC ....... *F16H 57/0435* (2013.01); *G05D 23/123*
    (2013.01); *G05D 23/22* (2013.01)
(58) Field of Classification Search
    CPC .... G05D 23/025; G05D 23/12; G05D 23/121;
    G05D 23/123; F01P 7/16; F01P
    2007/168; F01P 11/08; F01M 5/007;
    F16H 47/0417; F16H 47/0435
    See application file for complete search history.

(56) References Cited

U.S. PATENT DOCUMENTS

| | | | |
|---|---|---|---|
| 6,253,837 | B1 | 7/2001 | Seiler et al. |
| 8,083,209 | B2 | 12/2011 | Kozdras et al. |
| 8,141,790 | B2 | 3/2012 | Sheppard |
| 8,196,401 | B2 | 6/2012 | Pfister et al. |
| 2010/0126594 | A1* | 5/2010 | Sheppard ............... F01P 7/16 137/340 |

FOREIGN PATENT DOCUMENTS

| | | |
|---|---|---|
| CN | 203453050 U | 2/2014 |
| CN | 103827559 A | 5/2014 |
| GB | 1 498 011 A | 1/1978 |
| JP | 56-059071 A | 5/1981 |
| JP | 3570055 B2 | 9/2004 |
| JP | 2011-007321 A | 1/2011 |
| JP | 2014-145468 A | 8/2014 |
| KR | 10-2012-0039008 A | 4/2012 |
| KR | 10-2015-0043156 A | 4/2015 |
| SE | 7501607 A | 8/1975 |

\* cited by examiner

VALVE FOR VEHICLE TRANSMISSION OIL COOLER BYPASS

CROSS-REFERENCE TO RELATED APPLICATION

The present application claims priority to and the benefit of Korean Patent Application No. 10-2015-0084259 filed on Jun. 15, 2015, the entire contents of which is incorporated herein for all purposes by this reference.

BACKGROUND OF THE INVENTION

Field of the Invention

The present invention relates to a valve for a vehicle, and more particularly, to a valve for a vehicle that is provided between an oil cooler for cooling the transmission oil and a transmission to prevent a decrease in temperature of the transmission oil by allowing the transmission oil to bypass to the transmission depending on the temperature of the transmission oil, or supplies the transmission with the transmission oil cooled by inflow to the oil cooler.

Description of Related Art

In general, a valve is a device that is installed in a pipeline or in a container to allow inflow of a fluid including a gas such as air and a liquid such as water, and exhausts the inflow fluid to the outside or blocks the exhaust to control a flow rate and a pressure of the fluid.

Typically, such a valve is configured to be able to control the flow of a fluid by manipulating a valve seat through which fluid passes using a valve stem and a handle, or to be able to perform remote adjustment by detecting the temperature of the fluid flowing through the valve seat using a separate temperature control device.

Meanwhile, in recent years, the valve capable of being controlled depending on the temperature as described above has been applied to the cooling apparatus for cooling the transmission oil.

The conventional transmission oil cooling apparatus is divided into an air-cooling type and a water-cooling type, in order to prevent an excessive temperature rise due to slip of transmission components by keeping the temperature of the transmission oil at a predetermined temperature, and simultaneously in order to prevent an increase in friction loss of the transmission due to an increase in oil viscosity and a resultant deterioration of fuel consumption, at the time of excessive cooling of the transmission oil.

Among them, an air-cooled transmission oil cooling apparatus includes an oil cooler provided at a location such as a front of a radiator at which the outside air smoothly flows, and a bypass valve that is installed in a pipe between the oil cooler and the transmission to be opened and closed depending on the temperature of the transmission oil. Thus, when the temperature of the oil is higher than the predetermined temperature, the transmission oil is caused to pass through the heat exchanger via the bypass valve, and when the temperature of oil is lower than the predetermined temperature, the transmission oil is not allowed to pass through the heat exchanger, thereby keeping the transmission oil at the predetermined temperature.

However, in the bypass valve to be applied to the conventional transmission oil cooling apparatus as described above, since each of the constituent elements needs to be sequentially fitted and assembled to a valve mounting hole of a valve housing, there are drawbacks in which it is difficult to precisely position each of the constituent elements, excessive assembling time is required, and the manufacturing cost increases.

Furthermore, the bypass valve applied to the transmission oil cooling apparatus also has a drawback in which, when cooling of the transmission oil is not required, since a part of the low-temperature transmission oil cooled from the oil cooler flows into the bypass valve from the transmission and then flows into the transmission, together with the bypassed transmission oil in a high-temperature state, the rapid warming of the transmission oil is difficult.

In addition, since the conventional bypass valve is located in the flow passage pipe that connects the transmission and the oil cooler, and a relatively large bypass valve is located in the pipe, there is also a drawback in which spatial utility of an engine compartment is degraded.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a valve for a vehicle that is provided between the oil cooler for cooling the transmission oil and the transmission in a simple structure, and by controlling the flow stream of the transmission oil so as to allow the transmission oil depending on the temperature of the transmission oil.

An exemplary embodiment of the present invention provides the valve for a vehicle which is connected with a transmission, and is provided between an oil cooler for cooling transmission oil by heat-exchanging with outside air and the transmission, including: a housing of which an upper end portion is opened and a lower end portion is closed so as to have a space therein, a first inflow hole and a second exhaust hole, which communicate with the transmission, are formed in a one lateral side, and a first exhaust hole and a second inflow hole, which communicate with the oil cooler, are formed in the other lateral side, an inner body of which an upper end portion is closed and a lower end portion is opened, the upper end portion is fixedly mounted at the upper end portion of the housing on the state that the lower end portion is inserted into the space, at least one opening hole is formed on an exterior circumference, and a fixing groove is formed with inside of the upper end portion, a fixing rod of which an upper end is fixed to the fixing groove, a movable member of which one end portion is inserted into the lower end portion of the fixing rod so as to upwardly or downwardly move on the fixing rod by expanding or contracting according to a temperature of the transmission oil being flowed in the inside of the housing, a relief member configured that a penetration hole is formed at a center such that the lower end portion of the movable member selectively inserted therein, and slidably mounted in the opened lower end of the inner body, a first elastic member interposed between the movable member and the relief member, and a second elastic member interposed between the inner body and the relief member.

A stopping protrusion may be formed along the periphery of the exterior circumference surface of closed upper end portion of the inner body, and the inner body is fixed to the housing by a mounting ring which is fixedly mounted to an interior circumferential surface of the opened upper end portion of the housing.

The mounting ring may be fixedly mounted by a first ring groove formed along the periphery of the interior circumference of the upper end portion of the housing.

A seal ring that prevents the transmission oil flowing into the housing from leaking to the opened upper end portion of the housing may be mounted between the housing and the stopping protrusion.

The inner body may be formed at a position spaced apart from the fixing groove at a lower portion, and further includes a fixing portion of which a valve hole is formed corresponding to the movable member.

The inner body may include: a first opening hole formed at the upper portion of the inner body between the fixing groove and the fixing portion, a second opening hole respectively formed at the each lower portion of the fixing portion and the inner body at position spaced apart from the first opening hole, and a third opening hole formed at the lower end portion of the inner body at position spaced apart from the second opening hole at a lower portion.

The first, second and third opening holes may be respectively include a plurality of holes being formed at position spaced apart as a predetermined angle from each other along the exterior circumference of the inner body, and are formed to be apart from each other along the length direction of the inner body.

The first inflow hole is positioned to correspond with the second opening hole at the one lateral surface of the housing, and the first exhaust hole is positioned to correspond with the first opening hole at the other lateral surface of the housing, and the second inflow hole and the second exhaust hole may respectively be positioned to both side of the lower end portion of the housing at a position spaced apart from the lower end portion of the inner body.

An opening and closing member may be mounted at the one side of the movable member to correspond to the fixing portion of which selectively opens and closes the valve hole when the movable member performed to expansion or contraction.

The opening and closing member may be formed with a disk shape of which diameter bigger than the interior diameter of the valve hole, and is fixed to the movable member through a fixing ring, and an insertion hole is formed at the center of the opening and closing member so as to insert the movable member.

The opening and closing member may connect the first inflow hole and the second exhaust hole by maintaining the valve hole to be closed when the movable member is not deformed.

The opening and closing member may be moved toward the relief member together with the movable member so as to open the valve hole, when the movable member is moved on the fixing rod by performing expansion therein.

The relief member may include: an insert portion inserted from the opened lower end of the inner body toward the upper end thereof, and the penetration hole is formed on the center thereof along a length direction, and a supporting portion formed to protrude from the lower end exterior circumference of the insert portion toward the interior circumference of the inner body.

At least one bypass hole may be formed to the exterior circumference of the insert portion, and is communicated with the penetration hole.

The supporting portion may be prevented from being separated the inner body through a snap ring that is mounted to a second ring groove which is formed of the opened lower end interior circumference of the inner body.

The relief member may be raised in the inner body so as to inflow some of the transmission oils flowed through the second inflow hole into the housing when differential pressure occurs in the housing by the transmission oil flowed from the oil cooler.

The first elastic member may be formed by coil spring, one end of which is supported by the movable member, and the other end of which is supported by the upper surface of the insert portion in a state in which the movable member is inserted.

The second elastic member may be formed by coil spring, one end of which is supported by the fixing portion, and the other end of which is supported by the upper surface of the supporting portion.

The movable member may include a wax material that contracts and expands inside depending on the temperature of the transmission oil.

The first inflow hole and the first exhaust hole may be formed at a position intersecting the second inflow hole and the second exhaust hole in both sides of the housing.

As mentioned above, in accordance with a valve for a vehicle according to an exemplary embodiment of the present invention, by controlling the flow stream of transmission oil to allow the transmission oil to bypass or flow into the oil cooler, while rapidly expanding or contracting depending on the temperature of the transmission oil by being provided between the oil cooler for cooling the transmission oil and the transmission in a simple structure, there is an effect of achieving convenient manufacturing and assembling, and reducing manufacturing cost through simplification of the constituent elements.

Furthermore, there are effects in which the flow rate can be increased by securing the bypass flow passage compared to the related art, by preventing the transmission oil cooled by the oil cooler from leaking to the transmission in advance, reliability of the flow stream control according to temperature of the transmission oil can be secured.

In addition, the overall fuel consumption efficiency of the vehicle may be improved by reducing the friction loss inside the transmission through the rapid warming of the transmission oil.

Furthermore, when the transmission oil bypasses, it is possible to reduce the required power of a hydraulic pump through an increase in flow rate.

The maintenance cost can be reduced and the convenience of the replacement work can be improved as it is possible that the internal constituent elements can be replaced after failure by assembling the internal constituent elements to the housing later.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
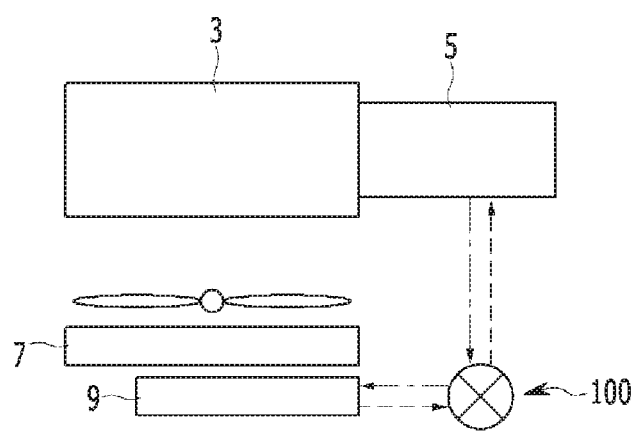
FIG. 1 is a block diagram of a transmission oil cooling apparatus to which a valve for a vehicle according to an exemplary embodiment of the present invention is applied.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

First, since the exemplary embodiment described in the specification and the configurations shown in the drawings are merely the most preferable exemplary embodiment and configurations of the present invention, they do not represent all of the technical ideas of the present invention, and it should be understood that that various equivalents and modified examples, which may replace the exemplary embodiments, are possible when filing the present application.

In order to clearly describe the present invention, parts that are irrelevant to the description are omitted, and identical or similar constituent elements throughout the specification are denoted by the same reference numerals.

Since the size and thickness of each configuration shown in the drawings are arbitrarily shown for convenience of description, the present invention is not necessarily limited to configurations illustrated in the drawings, and in order to clearly illustrate several parts and areas, enlarged thicknesses are shown.

Moreover, throughout the specification, unless explicitly described to the contrary, the word "comprise"—and variations such as "comprises" or "comprising" will be understood to imply the inclusion of stated elements but not the exclusion of any other elements.

Furthermore, terms such as " . . . unit", " . . . means", " . . . part", and " . . . member" described in the specification mean a unit of a comprehensive configuration having at least one function or operation.

Figure 2:
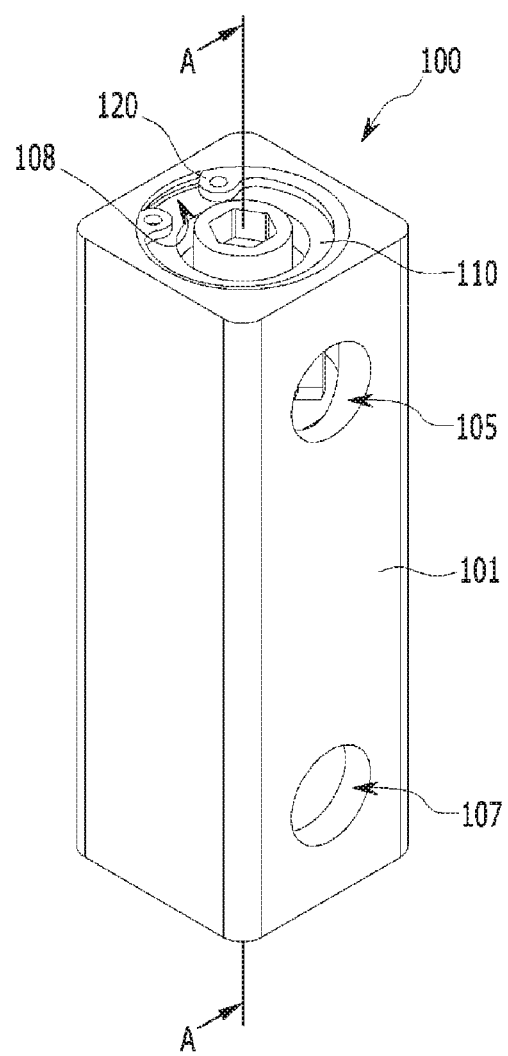
FIG. 2 is a perspective view of the valve for a vehicle according to an exemplary embodiment of the present invention.
Figure 3:
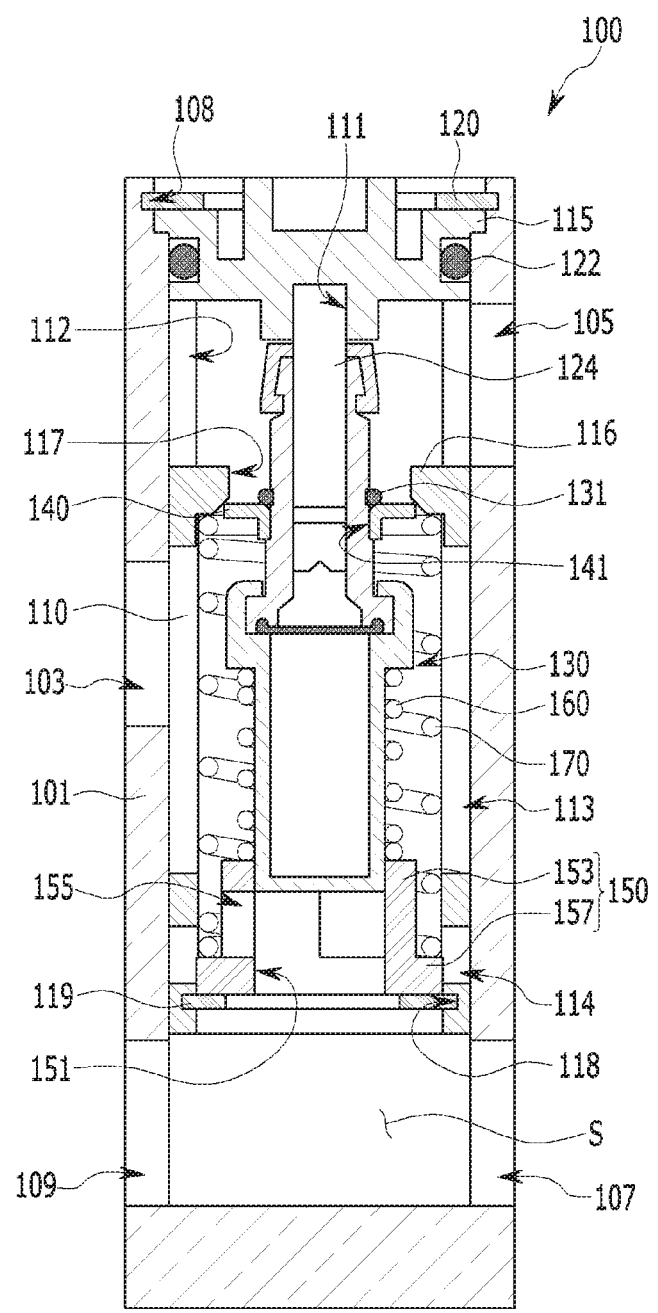
FIG. 3 is a cross-sectional view taken along A-A of FIG. 2.
Figure 4:
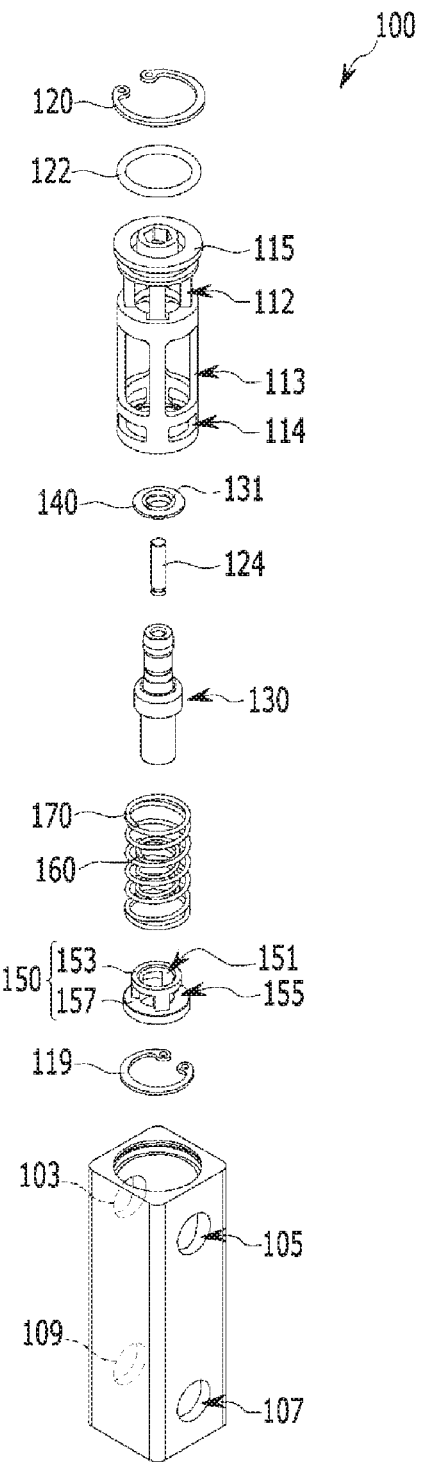
FIG. 4 is an exploded perspective view of the valve for a vehicle according to an exemplary embodiment of the present invention.

FIG. 1 is a block diagram of a transmission oil cooling apparatus to which a valve for a vehicle according to an exemplary embodiment of the present invention is applied, FIG. 2 is a perspective view of the valve for a vehicle according to an exemplary embodiment of the present invention, FIG. 3 is a cross-sectional view taken along A-A of FIG. 2, and FIG. 4 is an exploded perspective view of the valve for a vehicle according to an exemplary embodiment of the present invention.

Referring to the drawings, a valve 100 for a vehicle according to exemplary embodiment of the present invention is provided between the oil cooler 9 for cooling the transmission oil and the transmission 5 in a simple structure, and by controlling the flow stream of the transmission oil so as to allow the transmission oil depending on the temperature of the transmission oil.

To this end, as shown in FIG. 1, the valve 100 for a vehicle according to an exemplary embodiment of the present invention is provided between a transmission 5 and the oil cooler 9. The valve 100 is applied to a transmission oil cooling device when the transmission oil filled in the transmission 5 mounted on one side of an engine 3 is overheated, the oil cooler 9 disposed on one side of a radiator 7 cools the transmission oil through heat exchange with the flowing outside air while traveling.

As shown in FIG. 2 to FIG. 4, the valve 100 for vehicle includes a housing 101, an inner body 110, a fixing rod 124, a movable member 130, a relief member 150 and first and second elastic members 160 and 170.

The housing 101 of which an upper end is opened and a lower end is closed has a space S therein.

The housing 101 is formed in a square column shape. A first inflow hole 103 and a second exhaust hole 109, which is formed at a position being downwardly apart from the first inflow hole 103, are formed at one surface of the housing 101 so as to be respectively connected with the transmission 5.

Furthermore, at the other lateral side of the housing 101, a first exhaust hole 105 is formed to be communicated with the oil cooler 9 and a second inflow hole 107 is formed to be communicated with the oil cooler 9 at position downwardly spaced apart from the first exhaust hole 105.

The first inflow hole 103 and the first exhaust hole 105 may be formed at a position intersecting with the second inflow hole 107 at a both sides of the valve housing 110.

That is, the first inflow hole 103, which communicated with the transmission 5, is formed on an upper side of one lateral surface of the housing 101. And the first exhaust hole 105, which is communicated with the oil cooler 9, is formed on upper side of the other lateral side of the housing 101.

The second inflow 107, which is communicated with the oil cooler 9, is formed on the other lateral surface of the housing 101 at the position spaced apart from the lower portion of the first exhaust hole 105. And the second exhaust hole 109, which communicated with the transmission 5, is formed on the lower side of one lateral surface of the housing 101, so as to be positioned on the same line as the second inflow hole 107.

Accordingly, the transmission oil, which is exhausted from the transmission 5, is flowed in the housing 101 through the first inflow hole 103, and is exhausted to the oil cooler 9 through the first exhaust hole 105. And the transmission oil, which is cooled from the oil cooler 9, is flowed in the housing 101 through the second inflow hole 107, and is exhausted to the transmission 5 through the second exhaust hole 109.

The first and second inflow holes 103 and 107 and the first and second exhaust holes 105 and 109 may be communicated with the space S in which formed in the housing 101.

In the present exemplary embodiment, the inner body 110 is closed at an upper end portion and is opened at lower end portion. And the upper end portion of the inner body 110 is fixedly mounted at the upper end portion of the housing 101 on the state that the lower end portion is inserted into the space S.

At least one opening hole is formed on an exterior circumference of the inner body 110, and a fixing groove 111 is formed with inside of the upper end portion of the inner body 110.

Here, the inner body 110 may be formed of a cylinder shape, of which an upper end portion is closed and a lower end portion is opened.

Moreover, a stopping protrusion 115 may be formed along the periphery of the exterior circumference surface of closed upper end portion of the inner body 110, and the inner body 110 is fixed to the housing 101 by a mounting ring 120 which is fixedly mounted to an interior circumferential surface of the opened upper end portion of the housing 101.

The mounting ring 120 may be fixedly mounted by a first ring groove 108 formed along the upper interior circumference surface of the housing 101.

That is, the opened lower end portion of the inner body 110 is inserted into the opened upper end portion of the housing 101 such that the stopping protrusion 115 is locked on an inner circumferential surface of the housing 101, and the upper end portion of the inner body 110 is supported through the mounting ring 120 mounted in the first ring groove 108 so that the inner body 110 is fixedly mounted to the housing 110.

Meanwhile, a seal ring 122 that prevents the transmission oil flowing into the housing 101 from leaking to the opened upper end portion of the housing 101 may be mounted between the housing 101 and the stopping protrusion 115.

The seal ring 122 may seal between the exterior circumferential surface of the inner body 110 and the housing 101 at the lower of the stopping protrusion 115 to prevent the transmission oil from leaking to the outside.

Here, the inner body 110 is formed at a position spaced apart from the fixing groove 111 at a lower portion, and may further include a fixing portion 116 of which a valve hole 117 is formed corresponding to the movable member 130.

Meanwhile, the opening holes, formed on the inner body 110, include a first, second and third opening holes 112, 113, and 114.

The first opening hole 112 is formed at the upper portion of the inner body 110 between the fixing groove 111 and the fixing portion 116.

The second opening hole 113 is respectively formed at the each lower portion of the fixing portion 116 and the inner body 110 at position spaced apart from the first opening hole 112.

And the third opening hole 114 is formed at the lower end portion of the inner body 110 at position spaced apart from the second opening hole 113 at a lower portion.

The first, second and third opening holes 112, 113, and 114 are respectively include a plurality of holes being formed at position spaced apart as a predetermined angle from each other along the exterior circumference of the inner body 110, and may be formed to be apart from each other along the length direction of the inner body 110.

That is, four first, second and third opening holes 112, 113, and 114 are formed at positions spaced apart from each other around the exterior circumference of the inner body 110 at an angle of 90°.

Here, the first inflow hole 103 is positioned to correspond with the second opening hole 113 at the one lateral surface of the housing 101, and the first exhaust hole 105 is positioned to correspond with the first opening hole 112 at the other lateral surface of the housing 101.

The second inflow hole 107 and the second exhaust hole 109 may be respectively positioned to both side of the lower end portion of the housing 101 at a position spaced apart from the lower end portion of the inner body 110.

Meanwhile, in the present exemplary embodiment the four first, second and third opening holes 112, 113, and 114 formed at positions spaced from each other along the exterior circumference of the inner body 110 at an angle of 90 are described as an exemplary embodiment, but the present invention is not limited thereto, and the size, the number, and the positions of the each opening holes 112, 113, and 114 may be modified and applied.

In the present exemplary embodiment, the fixing rod 124 is formed of in a circular rod shape, and an upper end thereof is fixed to the fixing groove 111.

And one end portion of the movable member 130 is inserted to the lower end portion of the fixing rod 124.

The movable member 130 is upwardly or downwardly moved on the fixing rod 124 by expanding or contracting according to a temperature of the transmission oil being flowed in the inside of the housing 101. Accordingly, the position of the movable member 130 is varied through occurrence of linear displacement with the fixing rod 124.

Here, an opening and closing member 140 may be mounted at the one side of the movable member 130 to correspond to the fixing portion 116 of which selectively opens and closes the valve hole 117 when the movable member 130 performed to expansion or contraction.

In the present exemplary embodiment, the opening and closing member 140 is formed with a disk shape of which diameter bigger than the interior diameter of the valve hole 117, and an insertion hole 141 is formed at the center of the opening and closing member 140 so as to insert the movable member 130.

The opening and closing member 140 may be fixed to the movable member 130 through a fixing ring 131.

The opening and closing member 140 may connect the first inflow hole 103 and the second exhaust hole 109 through the second and third opening hole 113 and 114 by maintaining the valve hole 117 to be closed when the movable member 130 is not deformed.

Conversely, the opening and closing member 140 may be moved toward the relief member 150 together with the movable member 130 so as to open the valve hole 117, when the transmission oil exceeding the predetermined temperature flows into the movable member 130 is moved on the fixing rod 124 by performing expansion therein.

Meanwhile, in the present exemplary embodiment, the movable member 130 may include a wax material in which contraction and expansion are performed inside depending on the temperature of a working fluid such as transmission oil.

Here, the wax material is a material of which volume expands or contracts depending on the temperature and which has characteristics in which the volume expands therein when temperature increases, and then the volume contracts again when the temperature decreases and returns to an initial volume.

That is, the movable member 130 is formed by an assembly including the wax material inside, and when the volume deformation of the wax material occurs inside depending on the temperature, the movable member 130 can ascend or descend on the fixing rod 124, while an external form is not deformed.

Accordingly, when the transmission oil exceeding the predetermined temperature flows into the movable member 130 through the first inflow hole 103, as the volume thereof expands, the movable member 130 is descended toward the lower portion of the fixing rod 124 from the initial position which is mounted on the fixing rod 124.

Then, the opening and closing member 140 opens the closed valve hole 117 while descending together with the movable member 130, and compresses the first elastic member 160.

Conversely, as described above, when the transmission oil below the predetermined temperature flows in a state of expansion of volume, since the volume contracts, and the movable member 130 is ascended at the fixing rod 124 by elastic force of the compressed first elastic member 160.

Thus, the opening and closing member 140 returns the initial position while ascending together with the movable member 130, and closes the opened valve hole 117 again.

Furthermore, when the transmission oil below the predetermined temperature flows into the movable member 130 in the initial state mounted to the fixing rod 124, since the expansion or contraction does not occur, the position is not varied.

In the present exemplary embodiment, the relief member 150 is configured that a penetration hole 151 is formed at a center such that the lower end portion of the movable member 130 selectively inserted therein, and slidably mounted in the opened lower end of the inner body 110.

The relief member 150 may include an insert portion 153, which is inserted from the opened lower end of the inner body 110 toward the upper end thereof, and the penetration hole 151 is formed on the center thereof along a length direction, and a supporting portion 157 is formed to protrude from the lower end exterior circumference of the insert portion 153 toward the interior circumference of the inner body 110.

Here, at least one bypass hole 155 may be formed to the exterior circumference of the insert portion 153, and in the present exemplary embodiment, three bypass holes 155 are formed at positions spaced apart from each other around the exterior circumference of the insert portion 153 at an angle of 120°.

The bypass hole 155 exhausts the transmission oil, which is flowed into the first inflow hole 103 in state that the valve hole 117 is closed, through the penetration hole 151 to the second exhaust hole 109, thereby bypassing the transmission oil.

The bypass hole 155 bypasses the transmission oil, which is flowed into the first inflow hole 103 in state that the valve hole 117 is closed, so that the transmission oil may be exhausted from the second exhaust hole 109 through the penetration hole 151.

And the supporting portion 157 may be prevented from being separated the inner body 110 through a snap ring 119 that is mounted to a second ring groove 118 which is formed of the opened lower end interior circumference of the inner body 110.

That is, the lower end of the supporting portion 157 is supported through the snap ring 119, which is mounted in the second ring groove 118, in a state that the relief member 150 is inserted into the opened lower end of the inner body 110, so that the relief member 150 may not be separated from the inner body 110.

The relief member 150 as configured above rises in the inner body 110 when differential pressure occurs in the housing 101 by the transmission oil flowed from the oil cooler 9, so that the third opening hole 114 closed by the supporting portion 157 is opened so as to inflow some of the transmission oil flowed into the housing 101 through the second inflow hole 107 into the inner body 110.

In the present exemplary embodiment, the first elastic member 160 is interposed between the movable member 130 and the relief member 150.

The first elastic member 160 may be formed by coil spring, one end of which is supported by the movable member 130, and the other end of which is supported by the upper surface of the insert portion 153 in a state in which the movable member 130 is inserted.

When the movable member 130 ascends or descends depending on the expansion and contraction thereof, the first elastic member 160 is compressed or pulled to provide elastic force to the movable member 130.

The second elastic member 170 is interposed between the inner body 110 and the relief member 150.

Here, the second elastic member 170 may be formed by coil spring, one end of which is supported by the fixing portion 116, and the other end of which is supported by the upper surface of the supporting portion 157 in a state in which the first elastic member 160 is inserted.

The second elastic member 170 is compressed by rising of the relief member 150 when differential pressure occurs depending on the flow rate of the transmission oil flowed from the oil cooler 9 in the housing 101. The second elastic member 170 provides elastic force to the movable member 130 such that the movable member 130 returns the initial position thereof when differential pressure is relived depending on the flow rate of the transmission oil flowed from the oil cooler 9 in the housing 101.

Hereinafter, the operation of valve for a vehicle 100 configured as above will be described below referring to the accompanying FIG. 5 to FIG. 8.

Figure 5:
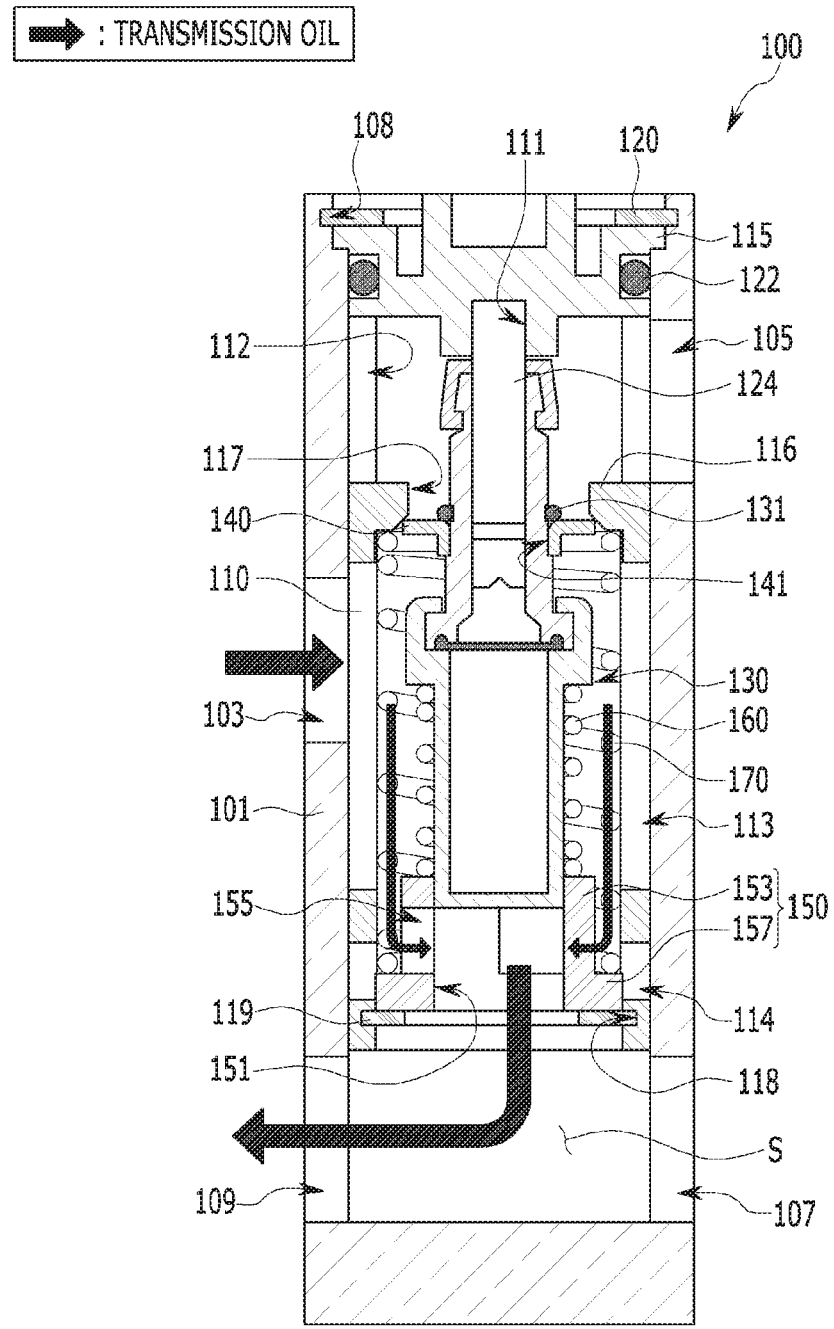
FIG. 5 and FIG. 6 are diagrams of a step-by-step operation state of the valve for a vehicle according to an exemplary embodiment of the present invention.
Figure 6:
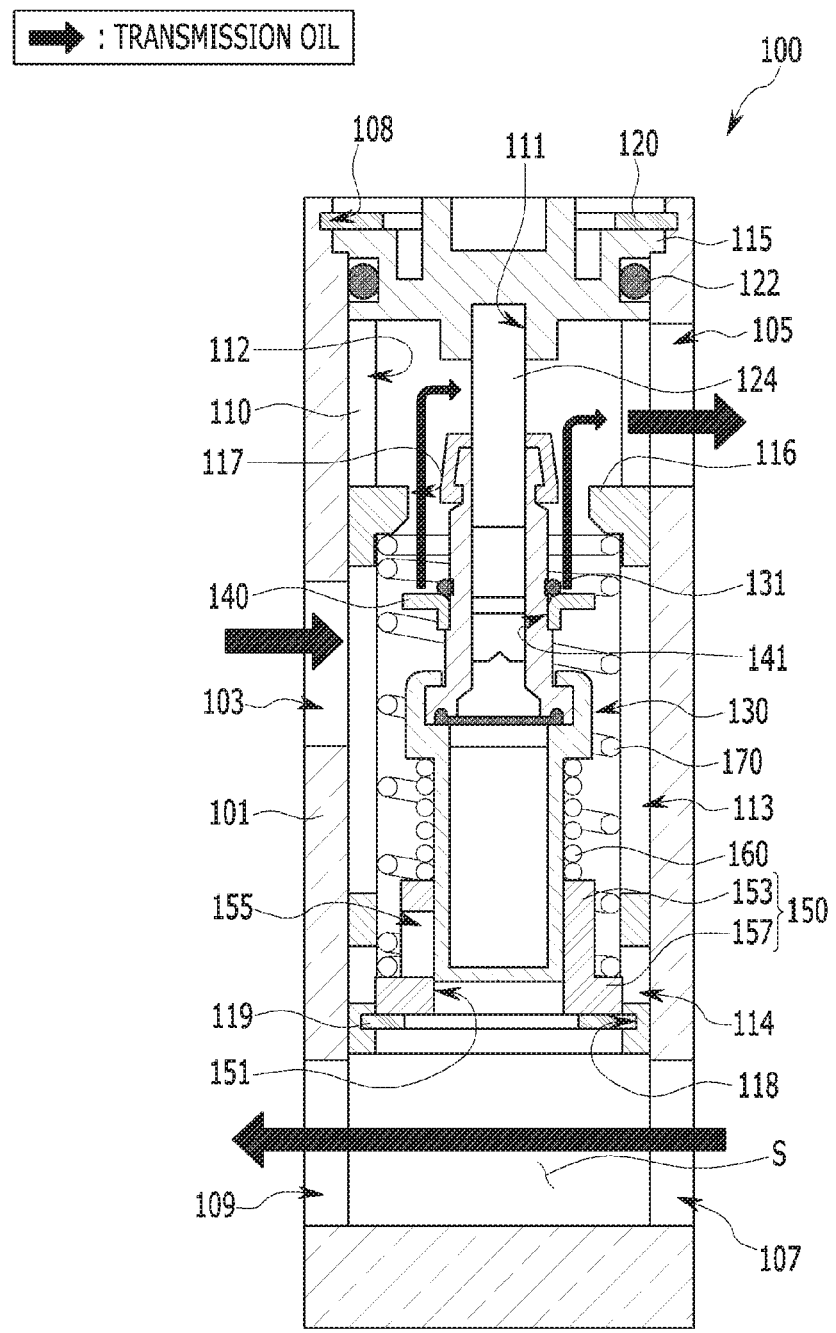

FIG. 5 and FIG. 6 are diagrams of a step-by-step operation state of the valve for a vehicle according to an exemplary embodiment of the present invention.

As shown in FIG. 5, when the transmission oil flowing in through the first inflow hole 103 is below the predetermined temperature, since the movable member 130 is not deformed, the opening and closing member 140 maintains the initial mounting state.

In this case, the opening and closing member 140 maintains the state in which the valve hole 117 is closed.

Accordingly, the transmission oil, which is flowed from the transmission 5 by the first inflow hole 103, is flowed in the inner body 110 through the second opening hole 113 and is exhausted to the penetration hole 151 through the bypass hole 155 which is form on the insert portion 153 of the relief member 150.

The transmission oil, which is exhaust from the inside of the inner body 110 through the penetration hole 151, is returned to the transmission 5 through the second exhaust hole 109 which is connected with the penetration hole 151.

That is, the valve 100 is able to rapidly warm up the transmission 5 by allowing the transmission oil below the predetermined temperature flowed from the transmission 5 to bypass to the transmission 5 again through the second exhaust hole 109, without cooling through the oil cooler 9 when the transmission oil is below the predetermined temperature.

Here, the transmission oil, which is cooled in the oil cooler 9, flows in through the opened second inflow hole 107, but since the transmission oil does not flow into the oil cooler 9 through the first inflow hole 105, only a very small amount of transmission oil flows through the second inflow hole 107 and flows into the transmission 5, together with the transmission oil allowed to bypass.

That is, the very small amount of cooled transmission oil having flowed through the second inflow hole 107 does not affect the temperature of the transmission oil allowed to bypass, and as the non-cooled transmission oil continuously bypasses and flows into the transmission 5, the warming of the transmission 5 can be more rapidly performed.

Thus, the valve 100 according to an exemplary embodiment of the present invention, since the transmission 5 can be more rapidly warmed through the above-described operation it is possible to improve the overall fuel efficiency of the vehicle by reducing the friction loss inside the transmission 5.

In contrast, as in FIG. 6, the opening and closing member 140 moves downward in the inner body 110 as the movable member 130 expands and is deformed when a temperature of the transmission oil having flowed through the first inflow hole 103 is the same as or higher than the predetermined temperature.

The opening and closing member 140 is moved downward in the inner body 110 such that the valve hole 117 is maintained in the open state, and the movable member 130 is inserted into the penetration hole 151 of the relief member 150 so as to close the bypass hole 155.

At this time, the transmission oil which flows into the first inflow hole 103 and having a temperature that is the same as or higher than the predetermined temperature flows into the oil cooler 9 through the second inflow hole 105 which is located at the first opening hole 112 by passing through the valve hole 117.

The transmission oil flowed into the oil cooler 9 is cooled by heat exchanging with the outside air, and is flowed into the valve 100 through the second inflow hole 107, and then flows from the housing 101 into the transmission 5 through the second exhaust hole 109.

Accordingly, the transmission oil cooled in the oil cooler 9 flows into the transmission 5 that is overheated due to the temperature rise of the transmission oil to cool the transmission 5.

Meanwhile, the first elastic member 160 is compressed by the movable member 130 which is expanded to be descended along the fixing rod 124.

In such a state, when the temperature of the transmission which is flowed through the first inflow hole 103 falls below the predetermined temperature, the movable member 130 is ascended on the fixing rod 124, while contracting and again being deformed to the initial state from the expansion state.

At this time, the movable member 130 more rapidly ascends to the initial position by elastic force of the compressed first elastic member 160 such that the opening and closing member 140 closes the opened valve hole 117.

And the relief member 150 is selectively operated in a state in which the bypass hole 155 is close, as the movable member 130 is descended along the fixing rod 124.

Figure 7:
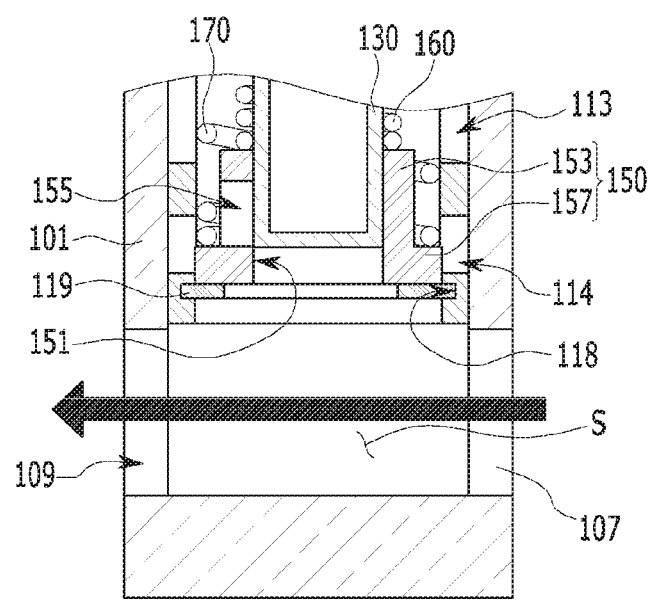
FIG. 7 and FIG. 8 are diagrams of a step-by-step operation state of a relief member applied to the valve for a vehicle according to an exemplary embodiment of the present invention.
Figure 8:
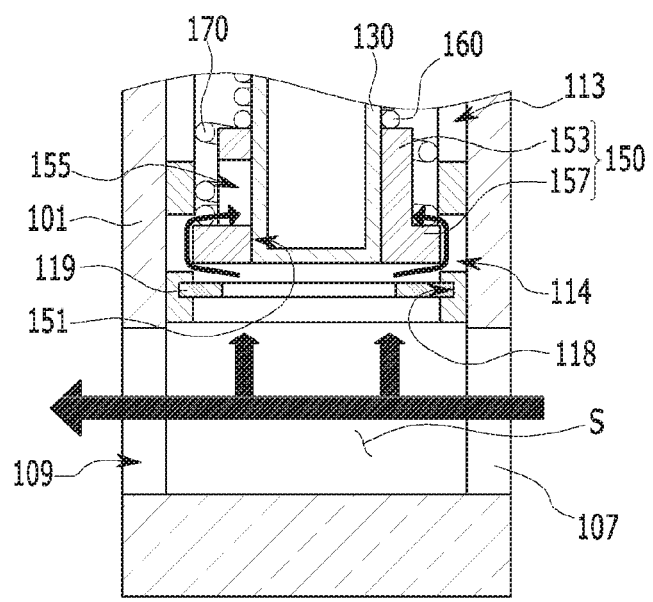

FIG. 7 and FIG. 8 are diagrams of a step-by-step operation state of a relief member applied to the valve for a vehicle according to an exemplary embodiment of the present invention.

When amount of the cooled transmission oil having flowed from the oil cooler 9 into the housing 101 via the second inflow hole 107 is low, the pressure difference is not generated between the inside of the inner body 110 and the bottom of the space S based on the relief member 150.

Accordingly, as in FIG. 7, the relief member 150 maintains the initial mounting state in which the third opening hole 114 is closed.

When an amount of the cooled transmission oil having flowed from the oil cooler 9 into the housing 101 via the second inflow hole 107 is increased, the pressure difference is generated between the inside of the inner body 110 and the bottom of the space S based on the relief member 150.

As shown in FIG. 8, the relief member 150 ascends by the pressure of the transmission oil due to the generated differential pressure to open the third opening holes 114.

Here, the second elastic member 170 is compressed by rising of the relief member 150.

Thus, a part of the cooled transmission oil having flowed through the second inflow hole 107 flows into the inner body 110 through the open third opening hole 114, thereby eliminating the generated pressure difference by the flow rate difference of the transmission oil.

Here, when the differential pressure inside the housing 101 is eliminated, the relief member 150 is rapidly lowered by elastic force of the compressed second elastic member 170 and returned to the initial mounting state, thereby again closing the third opening hole 114 as in FIG. 7.

That is, through the above-described operation, the valve 100 eliminates the pressure difference caused by the difference in flow rate of the transmission oil flowing into the housing 101 from the transmission 5 and the oil cooler 9, by the operation of the third opening hole 114 and the relief member 150, and thus, it is possible to improve the overall pressure resistance and durability of the valve 100 and to improve reliability and responsiveness of the valve operation.

As mentioned above, in accordance with a valve 100 for a vehicle according to an exemplary embodiment of the present invention, by controlling the flow stream of transmission oil to allow the transmission oil to bypass or flow into the oil cooler 9, while rapidly expanding or contracting depending on the temperature of the transmission oil by being provided between the oil cooler 9 for cooling the transmission oil and the transmission 5 in a simple structure.

Furthermore, the valve 100 is an effect of achieving convenient manufacturing, assembling, and reducing manufacturing cost through simplification of the constituent elements.

Furthermore, there are effects in which the flow rate may be increased by securing the bypass flow passage compared to the related art, by preventing the transmission oil cooled by the oil cooler 9 from leaking to the transmission 5 in advance, reliability of the flow stream control according to temperature of the transmission oil may be secured.

In addition, the overall fuel consumption efficiency of the vehicle may be improved by reducing the friction loss inside the transmission 5 through the rapid warming of the transmission oil.

Furthermore, when the transmission oil bypasses, it is possible to reduce the required power of a hydraulic pump through an increase in flow rate.

Moreover, the maintenance cost may be reduced and the convenience of the replacement work may be improved as it is possible that the internal constituent elements may be replaced after failure by assembling the internal constituent elements to the housing 101 later.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A valve for a vehicle in which the valve is connected with a transmission and is provided between an oil cooler for cooling transmission oil by heat-exchanging with outside air and the transmission, the valve comprising:
   a housing including a first inflow hole, a second inflow hole, a first exhaust hole, and a second exhaust hole, wherein the first inflow hole and the second exhaust hole are formed at a first lateral side of the housing and are configured to fluidly-communicate with the transmission, and wherein the first exhaust hole and the second inflow hole are formed at a second lateral side of the housing and are configured to fluidly-communicate with the oil cooler;
   an inner body wherein an upper end portion of the inner body is fixedly mounted at an upper end portion of the housing and a lower end portion of the inner body is inserted in the housing, and wherein at least one opening hole is formed on an exterior circumference of the inner body and a fixing groove is formed on the upper end portion of the inner body;
   a fixing rod of which an upper end is fixed to the fixing groove of the inner body;
   a movable member of which a first end portion is slidably engaged to the lower end portion of the fixing rod to upwardly or downwardly move along the fixing rod according to a temperature of the transmission oil being flowed in the inside of the housing;
   a relief member including a penetration hole formed at a center of the relief member, wherein the lower end portion of the movable member is selectively movable therein and the relief member is slidably mounted in the lower end portion of the inner body;
   a first elastic member interposed between the movable member and the relief member; and
   a second elastic member interposed between the inner body and the relief member,
   wherein the inner body is formed at a position spaced apart from the fixing groove at a lower portion thereof, and further includes a fixing portion in which a valve hole is formed corresponding to the movable member, and
   wherein the inner body comprises:
      a first opening hole formed at an upper portion of the inner body between the fixing groove and the fixing portion;
      a second opening hole respectively formed at a lower portion of the fixing portion and a lower portion of the inner body at a position spaced apart from the first opening hole; and
      a third opening hole formed at the lower end portion of the inner body at a position spaced apart from the second opening hole.

2. The valve of claim 1, wherein a stopping protrusion is formed along a periphery of an exterior circumference surface of the upper end portion of the inner body, and the inner body is fixed to the housing by a mounting ring which is fixedly mounted between an interior circumferential surface of the upper end portion of the housing and the exterior circumference surface of the upper end portion of the inner body.

3. The valve of claim 2, wherein the mounting ring is fixedly mounted to a first ring groove formed along a periphery of an interior circumference of the upper end portion of the housing.

4. The valve of claim 2, wherein a seal ring preventing the transmission oil flowing into the housing from leaking to the upper end portion of the housing is mounted between the housing and the stopping protrusion.

5. The valve of claim 1, wherein the first, second and third opening holes respectively include a plurality of holes being formed at a position spaced apart at a predetermined angle from each other along the exterior circumference of the inner body, and are formed to be apart from each other along a length direction of the inner body.

6. The valve of claim 1,
   wherein the first inflow hole is positioned to correspond with the second opening hole at the first lateral surface of the housing, and the first exhaust hole is positioned to correspond with the first opening hole at the second lateral surface of the housing, and
   wherein the second inflow hole and the second exhaust hole are respectively positioned to both sides of the lower end portion of the housing at a position spaced apart from the lower end portion of the inner body.

7. The valve of claim 1, wherein an opening and closing member is mounted at a side of the movable member to correspond to the fixing portion and wherein the opening and closing member is configured to selectively open and close the valve hole in response to movement of the movable member in relation to changes in the temperature of the transmission oil.

8. The valve of claim 7, wherein the opening and closing member is formed with a disk shape of which the diameter is bigger than an interior diameter of the valve hole, and is fixed to the movable member through a fixing ring, and an insertion hole is formed at the center of the opening and closing member to insert the movable member.

9. The valve of claim 7, wherein the opening and closing member connects the first inflow hole and the second exhaust hole by maintaining the valve hole to be closed when the movable member is not deformed.

10. The valve of claim 7, wherein the opening and closing member is moved toward the relief member together with the movable member to open the valve hole when the movable member is moved on the fixing rod by performing expansion therein.

11. The valve of claim 1, wherein the relief member includes:
   an insert portion into which the lower end portion of the movable member is slidably engaged, wherein the penetration hole is formed on the center thereof along a length direction of the insertion portion to receive the lower end portion of the movable member; and
   a supporting portion formed to protrude from a lower end exterior circumference of the insert portion toward the interior circumference of the inner body.

12. The valve of claim 11, wherein at least one bypass hole is formed to the exterior circumference of the insert portion, and is fluidly-communicated with the penetration hole.

13. The valve of claim 11, wherein the supporting portion is configured to be prevented from being separated from the inner body through a snap ring mounted to a second ring groove formed in an interior circumference of the inner body.

14. The valve of claim 10, wherein the relief member is configured to be raised in the inner body to inflow an amount of the transmission oil flowed through the second inflow hole into the housing when a differential pressure occurs in the housing by the transmission oil flowed from the oil cooler.

15. The valve of claim 11, wherein the first elastic member is formed by a coil spring, a first end of which is supported by the movable member, and a second end of which is supported by an upper surface of the insert portion in a state in which the movable member is inserted.

16. The valve of claim 11, wherein the second elastic member is formed by a coil spring, a first end of which is supported by the fixing portion, and a second end of which is supported by an upper surface of the supporting portion.

17. The valve of claim 1, wherein the movable member includes a wax material in which contraction and expansion of the wax are performed inside the movable member depending on the temperature of the transmission oil.

18. The valve of claim 1, wherein the first inflow hole and the first exhaust hole are formed at a position intersecting the second inflow hole and the second exhaust hole in both sides of the housing.

* * * * *